United States Patent
Streng et al.

(10) Patent No.: US 10,112,847 B2
(45) Date of Patent: *Oct. 30, 2018

(54) METHOD AND APPARATUS FOR TREATING LIQUID CONTAINING IMPURITIES

(71) Applicant: Parkson Corporation, Fort Lauderdale, FL (US)

(72) Inventors: Adrian Streng, Hollywood, FL (US); Brett H. Boyd, Coral Springs, FL (US)

(73) Assignee: PARKSON CORPORATION, Fort Lauderdale, FL (US)

( * ) Notice: Subject to any disclaimer, the term of this patent is extended or adjusted under 35 U.S.C. 154(b) by 567 days.

This patent is subject to a terminal disclaimer.

(21) Appl. No.: 14/185,617

(22) Filed: Feb. 20, 2014

(65) Prior Publication Data

US 2014/0284283 A1 Sep. 25, 2014

Related U.S. Application Data

(63) Continuation of application No. 12/848,842, filed on Aug. 2, 2010, now Pat. No. 8,658,031.

(Continued)

(51) Int. Cl.
  *B01D 35/00* (2006.01)
  *C02F 1/00* (2006.01)
  (Continued)

(52) U.S. Cl.
  CPC .............. *C02F 1/004* (2013.01); *B01D 24/14* (2013.01); *B01D 24/36* (2013.01);
  (Continued)

(58) Field of Classification Search
  CPC ...................... C02F 2103/02; B01D 2024/145
  (Continued)

(56) References Cited

U.S. PATENT DOCUMENTS

| 3,765,535 A | 10/1973 | Anderson et al. |
| 4,051,032 A | 9/1977 | Borchardt |

(Continued)

FOREIGN PATENT DOCUMENTS

| CN | 1380835 A | 11/2002 |
| CN | 101511443 A | 8/2009 |
| WO | WO2009/088288 | * 1/2009 |

OTHER PUBLICATIONS

Examination Report for GCC Patent Office issued in application No. 2010-16556 dated Oct. 16, 2014.

(Continued)

*Primary Examiner* — Richard C Gurtowski
(74) *Attorney, Agent, or Firm* — Gilberto M. Villacorta; Kiri L. Sharon; Foley & Lardner LLP (57) ABSTRACT

A method and an apparatus for treating a liquid containing impurities may include a filtering chamber configured to permit granular media to interact with liquid containing impurities, thereby removing impurities from the liquid to produce filtrate; a filtrate section for receiving the filtrate; a gas supplying system for delivering gas to the granular media in the filtering chamber for transport of a portion of the granular media to a granular media washer; a reject section in fluid communication with the granular media washer for receiving a reject mixture comprising liquid and impurities from the granular media washer; and a control unit that is configured to determine whether the portion of the granular media is being transported properly based on an amount of reject mixture in the reject section.

30 Claims, 6 Drawing Sheets

Related U.S. Application Data (60) Provisional application No. 61/293,509, filed on Jan. 8, 2010.

(51) Int. Cl.
  *B01D 24/14* (2006.01)
  *B01D 24/46* (2006.01)
  *B01D 24/48* (2006.01)
  *B01D 24/36* (2006.01)
  *C02F 103/02* (2006.01)

(52) U.S. Cl.
  CPC ..... *B01D 24/4652* (2013.01); *B01D 24/4689* (2013.01); *B01D 24/4869* (2013.01); *B01D 2024/145* (2013.01); *B01D 2101/04* (2013.01); *C02F 2103/02* (2013.01); *C02F 2209/006* (2013.01)

(58) Field of Classification Search
  USPC ........ 210/744, 96.1, 97, 739, 765, 786, 792, 210/793, 798, 189, 276, 263, 265, 269, 210/280, 283, 285, 287, 291, 86
  See application file for complete search history.

(56) References Cited

U.S. PATENT DOCUMENTS

| | | |
|---|---|---|
| 4,206,522 A | 6/1980 | Baker |
| 4,246,102 A | 1/1981 | Hjelmner et al. |
| 4,353,722 A | 10/1982 | Berz |
| 4,435,286 A | 3/1984 | Louboutin et al. |
| 4,578,186 A | 3/1986 | Morin |
| 4,676,914 A | 6/1987 | Mills et al. |
| 5,252,230 A | 10/1993 | Dunkers |
| 5,468,397 A | 11/1995 | Barboza et al. |
| 5,582,722 A | 12/1996 | Wachinski et al. |
| 6,426,005 B1 | 7/2002 | Larsson |
| 8,246,818 B2 | 8/2012 | Korzeniowski |
| 2002/0030020 A1 | 3/2002 | Moorehead et al. |
| 2003/0220717 A1 | 11/2003 | Underwood et al. |
| 2005/0077247 A1 | 4/2005 | Stedman |
| 2005/0103721 A1 | 5/2005 | Fritze |
| 2006/0081533 A1 | 4/2006 | Khudenko |
| 2007/0210012 A1 | 9/2007 | Schmidt et al. |
| 2009/0071909 A1* | 3/2009 | Newcombe ............ B01D 24/30 210/739 |
| 2011/0024369 A1 | 2/2011 | Reekers |
| 2011/0168615 A1 | 7/2011 | Boyd et al. |
| 2011/0168641 A1 | 7/2011 | Boyd et al. |
| 2011/0168643 A1 | 7/2011 | Streng et al. |

OTHER PUBLICATIONS

Examination Report issued in Australian Application No. 2010340333 dated Sep. 17, 2015.
Supplementary Novelty Search Report for GCC Patent Office issued in application No. GC 2010-16556 dated Mar. 20, 2015.
Examination Report for GCC Patent Office issued in application No. GC 2010-16557 dated Feb. 17, 2016.
Examination Report for GCC Patent Office, Application No. GC 2010-16556 dated Oct. 16, 2014.
Supplementary Novelty Search Report for GCC Patent Office, Application No. GC 2010-16556 dated Oct. 16, 2014.
Examination Report for GCC Patent Office, Application No. GC 2010-16557 dated Oct. 30, 2014 with English translation.
Examination Report in Australian Application No. 2010340292 dated Sep. 24, 2014.
Examination Report in Australian Application No. 2010340333 dated Oct. 29, 2014.
Examination Report in GC Appln No. 2010-16557 dated Apr. 20, 2014.
Examination Report received in New Zealand Appln No. 601052, dated Feb. 18, 2013.
First Examination Report in NZ Appln No. 623725 dated May 2, 2014.
Search Report and Written Opinion dated Sep. 17, 2010 in International Appln No. PCT/US10/44161.
Search Report and Written Opinion dated Sep. 27, 2010 in International Appln No. PCT/US10/44103.
Office Action issued in related U.S. Appl. No. 14/245,311, dated Dec. 1, 2016.

* cited by examiner

METHOD AND APPARATUS FOR TREATING LIQUID CONTAINING IMPURITIES

This application is a continuation application of U.S. application Ser. No. 12/848,842, filed Aug. 2, 2010, now U.S. Pat. No. 8,658,031, which claims priority to U.S. Provisional Patent Application Ser. No. 61/293,509, entitled METHOD AND APPARATUS FOR TREATING LIQUID CONTAINING IMPURITIES, filed Jan. 8, 2010, all of which are incorporated herein by reference in their entirety.

BACKGROUND

The present invention relates to the treatment of a liquid containing impurities in which a determination is made as to whether a portion of granular media is being transported properly to a granular media washer based on an amount of reject mixture in the reject section.

In connection with many municipal and industrial water treatment systems, water/wastewater needs to be purified. One example can be a drinking water system in which drinking water is produced from surface water. Another example may be a municipal wastewater treatment system in which the wastewater needs to be treated so that it can be discharged or reused for industrial, irrigational, or similar purposes.

Backwash upflow filters typically use airlifts in granular beds to stimulate the interaction between the granular beds and a liquid containing impurities to assist in separating the impurities from the liquid. Such filters typically do not have a device to detect and correct for the loss of airlift function. If the generated airlift stops lifting filter media, after a period of time the filter bed will become packed with feed solids. Eventually, "break though" will occur which will release excessive amounts of suspended solids into the filtrate, thus creating unacceptable filtrate quality. The detection of airlift failures conventionally requires physical observation by an operator, and manual efforts to correct the situation. Unfortunately, airlift failures are often not noticed and corrected for hours or even days, and the corrective actions, such as removal and replacement of the airlift and/or the media bed or labor intensive air lancing of the bed are required.

It is desired to provide a new and improved method and apparatus for the treatment of a liquid containing impurities, such as wastewater. For example, in the method and apparatus, the impurities and/or pollutants can be separated from the wastewater or other liquid in a granular media filter, such as a sand filter.

SUMMARY OF THE INVENTION

According to one embodiment of the present invention, an apparatus for treating a liquid containing impurities, may comprise: a filtering chamber for receiving liquid containing impurities, the filtering chamber including a lower portion containing granular media and configured to permit the granular media to interact with the liquid containing impurities, thereby removing impurities from the liquid to produce filtrate; a filtrate section in fluid communication with the filtering chamber for receiving the filtrate, the filtrate section being in fluid communication with a first outlet for outflow of the filtrate; a gas supplying system for delivering gas to the granular media in the filtering chamber for transport of a portion of the granular media to a granular media washer; a reject section in fluid communication with the granular media washer for receiving a reject mixture comprising liquid and impurities from the granular media washer, the reject section being in fluid communication with a second outlet for outflow of a portion of the reject mixture; and a control unit that is configured to determine whether the portion of the granular media is being transported properly based on an amount of reject mixture in the reject section.

According to another embodiment of the present invention, a method for treating a liquid containing impurities may comprise: feeding a liquid containing impurities into a filtering chamber containing granular media; removing impurities from the liquid to produce filtrate by allowing granular media, liquid and impurities to interact in a lower portion of the filtering chamber; allowing filtrate to flow to a filtrate section for subsequent outflow through a first outlet; delivering gas to granular media in the filtering chamber to transport a portion of the granular media to a granular media washer; allowing a reject mixture comprising liquid and impurities to flow to a reject section from the granular media washer, the reject section being in fluid communication with a second outlet for outflow of a portion of the reject mixture; and determining whether the portion of the granular media is being transported properly based on an amount of reject mixture in the reject section.

According to another embodiment of the present invention, a method of detecting a possible malfunction of an airlift operation in a granular media filter may comprise determining, in a granular media filter configured to include an airlift operation to transport granular media to a granular media washer that is in fluid communication with a reject section, an amount of reject mixture in the reject section.

It is to be understood that both the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Various embodiments of the present invention will be explained with reference to the accompanying drawings.

Figure 1:
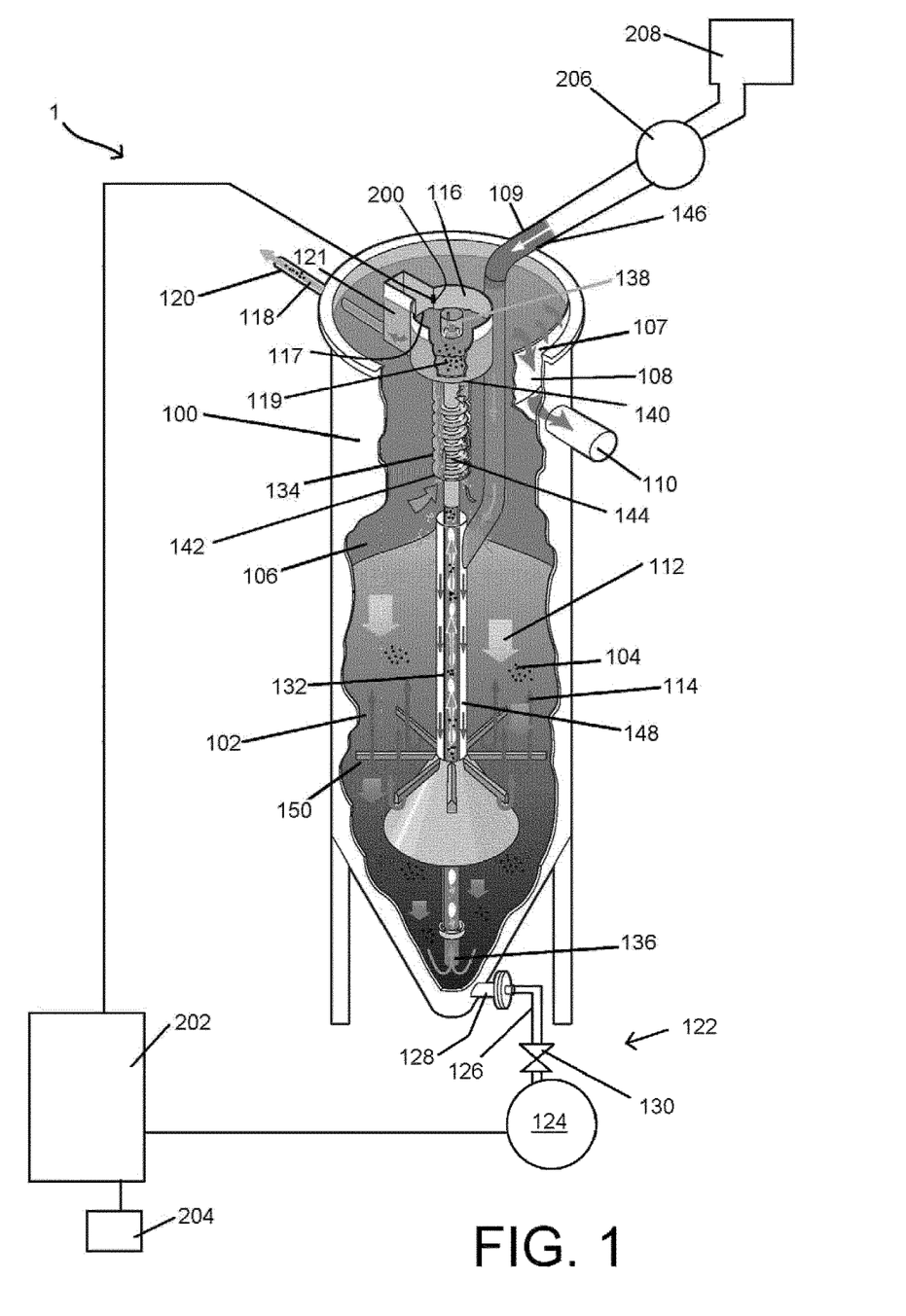
FIG. 1 shows a schematic drawing of an apparatus for treating a liquid containing impurities according to an embodiment of the present invention.

FIG. 1 shows an apparatus 1 for treating a liquid containing impurities (for example, any undesired material) according to an embodiment of the present invention. The apparatus 1 may be an upflow, deep bed granular media filter with continuous backwash. The liquid containing impurities (for example, wastewater) is introduced through an inlet 109 and channeled to below a portion of the granular media 104 (which can be, for example, sand) and into the filtering chamber 100. A bed of granular media 104 (which acts as the filtering medium) fills the filtering chamber.

The liquid containing impurities will rise upward in the filtering chamber 100 so that it flows through the granular media bed. The filtration of the liquid takes place as the granular media is traveling slowly downward in the filtering chamber 100 as indicated by arrow 112 such that removal of the impurities from the liquid is facilitated by the granular media to produce the filtrate. Gas is also supplied to the airlift housing 132 near the bottom of the filtering chamber. The gas is introduced into the airlift housing 132, which will then contain a mixture of liquid, air and granular filter media. The mixture of liquid, air and granular filter media has a lower density than the surrounding liquid causing the mixture to rise in the airlift housing 132. As this mixture rises in the airlift housing, granular media and liquid near the bottom of the filtering chamber will flow into the airlift housing 132 such that the dirtiest of the granular media tends to flow into and upward in the airlift housing 132.

As the dirty granular media flows upward in the airlift housing, the granular media is subjected to a thorough mechanical agitation by the action of the gas bubbles within the airlift housing 132 and the impurities (such as, dirt or other undesirable material) is separated from the granular media. In order to further clean the particles or granular media, the media is washed in a granular media washer 134 which is located near the top end of the filtering chamber 100. The cleaned granular media from the granular media washer 134 is returned to the top of the bed of granular media 104 whereas the reject from the granular media washer 134 flows from the washer 104 to a reject section 116 so as to be discharged through the outlet 120. On the other hand, the treated liquid or filtrate flows into a filtrate section 108 and is discharged as an effluent through an outlet 110.

Using an upflow, deep bed granular media filter (such as the one in FIG. 1), the filter media may be cleaned by a simple internal washing system that does not require backwash pumps or storage tanks. The absence of backwash pumps has the advantage of low energy consumption. The granular media bed allows the apparatus to handle high levels of suspended solids and this heavy-duty performance may eliminate the need for pre-sedimentation or flotation steps in the treatment process in some applications. The granular media permits a substantial removal of the impurities from the liquid, such as up to 85, 90, 95, 99% or more, or any integer therebetween.

The details of the apparatus 1 in FIG. 1 will now be described. The apparatus 1 may comprise a filtering chamber 100 for accepting the liquid containing impurities, a filtrate section 108, a reject section 116, a gas supplying system 122, and a control unit 202.

The filtering chamber 100 includes a lower portion 102 in which granular media 104 removes the impurities from the liquid 106 to produce filtrate. The lower portion 102 is deemed lower because it is positioned within the lower half of the filtering chamber in a vertical direction. Although the filtering chamber 100 of FIG. 1 has a cylindrical shape, any suitable shape may be used, such as a chamber having a cross-section that is circular, rectangular, square, triangular, or other polygonal or non-polygonal shapes. The filtering chamber 100 may be in fluid communication with a first inlet 109 for the inflow of influent or liquid containing impurities.

The first inlet 109 may be in fluid communication with a liquid source 208 (such as a reservoir) which contains the liquid containing impurities. The liquid 106 may be wastewater or water with impurities. A pumping system 206 can be used to channel the liquid from the liquid source 208 to the first inlet 109. The pumping system 206 may contain all the necessary equipment to initiate and maintain the fluid flow between the liquid source 208 and the filtering chamber 100, such as a pump, a control valve, and/or suitable piping/tubing. The first inlet 109 may comprise a feed pipe 146, an annular pipe 148, and radial pipes 150. The influent or liquid containing impurities is introduced at the top of the feed pipe 146 and flows downward through the annular pipe 148 around the airlift housing 132 (to be described later). The annular pipe 148 is sealed at its top end and is in fluid communication with the feed pipe 146 and the radial pipes 150 such that the liquid is introduced into the bed of the granular media 104 through the series of radial pipes 150 that are open or have individual openings along their longitudinal length on the sides facing the bottom of the filtering chamber 100 (that is, downward in FIG. 1).

Other configurations for the inlet are contemplated. For example, alternative embodiments of the present invention may include one or more of the following structures: the feed pipe 146 may be directly connected to the radial pipes 150 without the annular pipe 148, the radial pipes 150 may be opened at their distal ends, the radial pipes 150 may have outlets along their circumferential surfaces in the form of one or more holes along their bottom surfaces, the radial pipes may simply be U-shaped structures with their open ends facing downward, a pipe running parallel to the airlift housing 132 may be used instead of the annular pipe 148, and/or the feed pipe 146 may enter the filtering chamber near the bottom or towards the center of the filtering chamber instead of at the top.

The granular media 104 may be sand and may create any suitable size of bed, such as a 40" wide bed or a 80" wide bed. Further, the bed may be any suitable depth. Suitable depths may include, for example, 1, 2, 3, 4, 5, or more meters, and may also include less than 1 meter depths.

The granular media 104 in the filtering chamber can descend in a downward direction as indicated by the arrow 112 and the liquid 106 in the filtering chamber 100 can flow in an upward direction such that the impurities are removed from the liquid by impacting the granular media 104 to produce filtrate at the top of the bed of granular media 104. Indeed, the filtration of the liquid takes place as the granular media 104 is traveling slowly downward in the filtering chamber 100 as indicated by arrow 112. The slow downward movement of the granular media in the bed is caused by the granular media being sent up into the airlift housing 132 by the airlift operation of the gas supplying system 122.

The filtrate section 108 may be in fluid communication with the lower portion 102 of the filtering chamber 100 for receiving the filtrate that has passed through the granular media 104. The filtrate section may be an open end container, enclosure, or any suitable fluid containing structure. According to one embodiment, the filtrate section 108 comprises a weir 107. The filtrate that has emerged at the top portion of the filtering chamber 100 pours over the weir 107 and into the filtrate section 108. The filtrate section 108 may be in fluid communication with a first outlet 110 for the outflow of effluent or the filtrate. The first outlet 110 may be piping, tubing, or connections in which piping or tubing may be connected.

The reject section 116 may be in fluid communication with the lower portion 102 of the filtering chamber 100 for receiving a reject mixture 118 containing granular media and impurities. The reject section may be an open end container, enclosure, or any suitable fluid containing structure. The fluid communication can be configured such that the reject section 116 is in fluid communication with the airlift housing 132. The airlift housing 132 is a structure, such as a cylindrical pipe or tube, that may run through the center of the filtering chamber 100 and inside the annular pipe 148. As the granular media 104 in the filtering chamber 100 descends in the downward direction 112 such that the impurities are removed from the liquid by the granular media 104, near the bottom of the filtering chamber 100, a small volume of compressed gas, such as air, nitrogen, oxygen, or the like, is introduced at the bottom of the filtering chamber 100 by the gas supplying system 122 so as to draw the granular media into the airlift housing 132 at the bottom end 136 of the airlift housing 132. Scouring inside the airlift housing 132 dislodges any solid particles attached to the granular media. The reject mixture of granular media and dislodged impurities (which may form a dirty slurry) is pushed to the top end 138 of the airlift housing 132 and into the reject section 116.

The reject section 116 may comprise an inlet section 119 and an outlet section 121 that are isolated from each other by a weir 117. The reject mixture that has emerged from the airlift housing 132 at the top end 138 of the airlift housing 132 fills up the inlet section 119 of the reject section 116 until a portion of the reject mixture pours over the weir 117 into the outlet section 121 of the reject section. The outlet section 121 of the reject section 116 may also be in fluid communication with a second outlet 120 for the outflow of the portion of the reject mixture 118 that has poured over the weir 117. The second outlet 120 may be a piping, tubing, or a connection in which piping or tubing may be connected.

Figure 2:
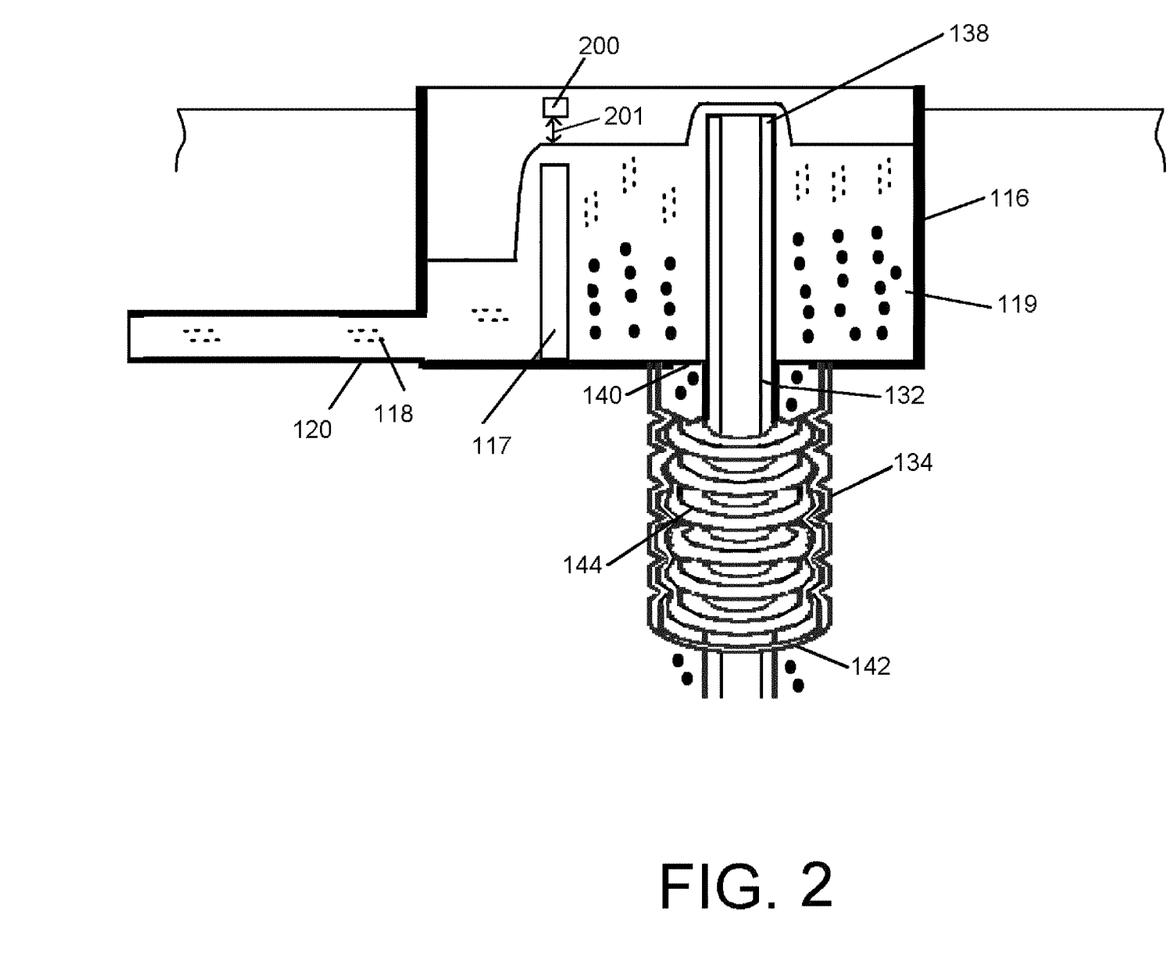
FIG. 2 shows a schematic drawing of reject section of FIG. 1.

As seen in FIG. 1 and FIG. 2, the inlet section 119 of the reject section 116 also is in fluid communication with a granular media washer 134, and the granular media washer 134 is in fluid communication with the filtrate section. The granular media washer has a granular media inlet 140, a granular media outlet 142, and concentric stages 144. From the reject section 116, the heavier granular media 104 falls into the granular media washer 134 via the granular media inlet 140 and the lighter reject solids that were dislodged from the granular media flow are eventually poured over the weir 117 and out the second outlet 120. The granular media 104 cascades down through the concentric stages 144 of the granular media washer 134. The concentric stages 144 may simply comprise spiral flights around the airlift housing 132. As the granular media is cascading down the concentric stages, it encounters a small amount of filtrate moving upward through the washer 134 from the granular media outlet 142. This filtrate in the washer 134 is driven by the difference in liquid level between the filtrate pool in the filtering chamber 100 and the reject section 116. The heavier, coarser granular media flows through this small counter current flow while the remaining impurities are carried back up to the reject section 116. The washed granular media returns to the filtering chamber 100 and is deposited on the top of the granular media bed where it once again begins the influent cleaning process and its eventual migration to the bottom of the filtering chamber 100.

The gas supplying system 122 may be provided for delivering gas to the granular media 104 in the filtering chamber 100 to provide airlift to the granular media 104 such that a portion of the granular media in the filtering chamber may be transported to granular media washer 134 (via the airlift housing 132 and the reject section 116). The gas supplying system 122 may comprise a gas source 124, a gas line 126 in fluid communication with the gas source 124, and a gas inlet 128 attached to the filtering chamber 100 and in fluid communication with the gas line 126 and the lower portion 102 of the filtering chamber 100. The gas source 124 may be a fan, a gas pump, a pressurized cylinder of gas, or some other suitable source of gas. The gas source may also be within the housing of the filtering chamber 100 or the gas source 124 may be directly connected to the gas inlet 128. The gas being introduced into the filtering chamber 100 by the gas source 124 may be air, nitrogen, oxygen, or some other suitable gas. A control valve 130 may be optionally used to control the gas flow and/or pressure from the gas source 124 to the lower portion 102 of the filtering chamber 100.

As used herein, the term "airlift" is meant to encompass lift caused by gas delivery by the gas supplying system regardless of the type of gas used. In other words, "airlift" encompasses lift by any suitable gas, such as nitrogen, oxygen, or other suitable gases beside air.

A sensor 200 may be provided for determining a level of reject mixture in the reject section 116 and a control unit 202 may be provided to control the gas supplying system 122 and to receive one or more signals from the sensor 200. Typically, when an airlift operation stops lifting the granular media, the reject flow rate increases. A lack of airlift prevents the granular media from being drawn into (and transported through) the airlift housing 132 at the bottom end 136 of the airlift housing 132 and entering the reject section 116. The airlifted (or transported) media grains falling down through the concentric stages 144 of the granular media washer 134 usually restrict the upward flow of the wash liquid (the wash liquid being clean filtrate below the granular media washer 134 that becomes reject liquid as it moves upward through the concentric stages 144 of the granular media washer 134 scouring the dirt and impurities from the falling filter media). If there is less or no granular media in the reject section 116 that can fall through the granular media washer 134, there is no falling media to restrict the upward rise of the wash liquid through the granular media washer 134; thus causing more than normal fluid flow into the reject section. As a result, the reject flow rate increases when the airlift stops its normal functioning. Thus, the amount of reject mixture is increased in the reject section, and particularly in the inlet section and the area above the weir 117 of the reject section. Although the following description places the sensor above the weir 117 in the reject section 116, the sensor 200 can alternatively be placed on either side of the weir in the inlet section 119 or the outlet section 121.

Figure 6:
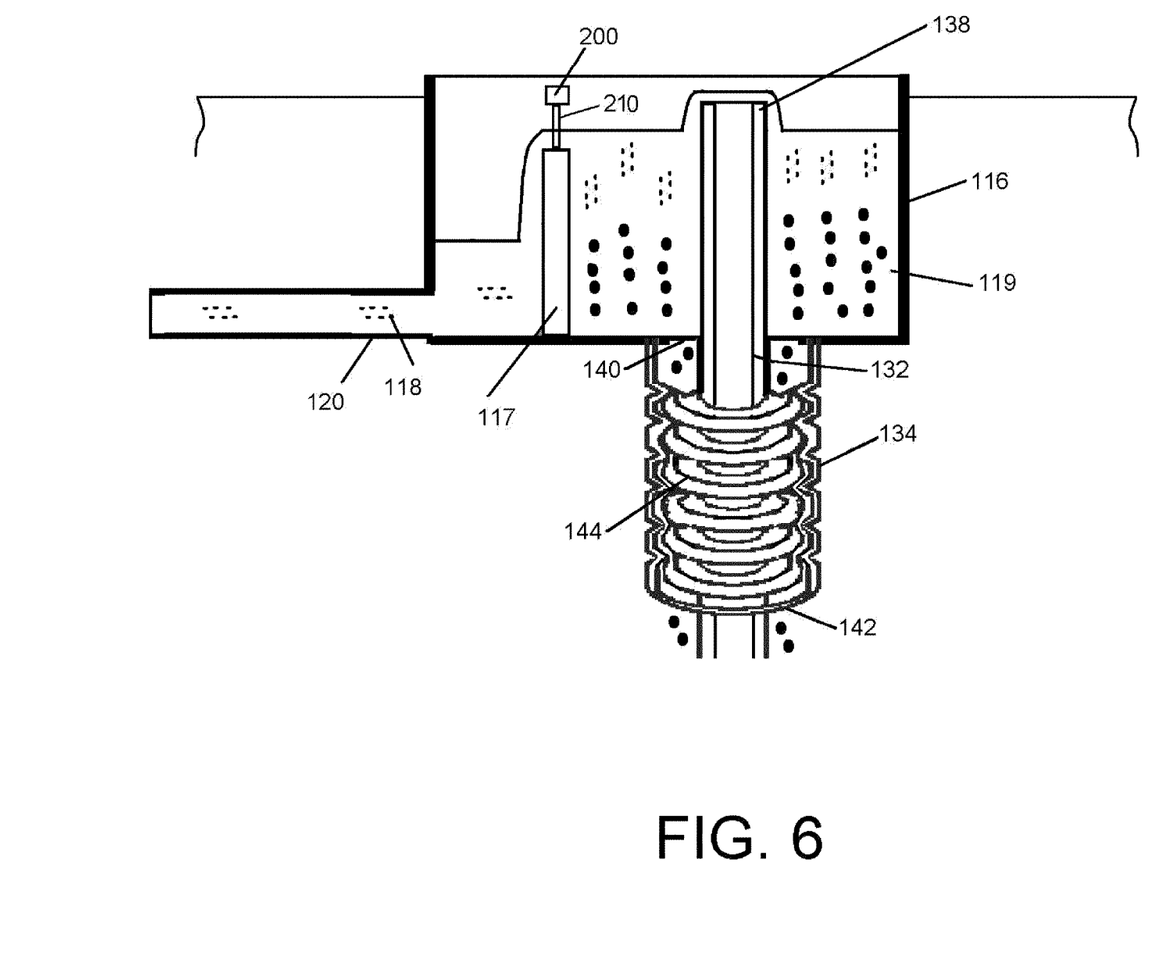
FIG. 6 shows a schematic drawing of a reject section according to another embodiment of the present invention.

The combination of the sensor and control unit can be configured to effectively and continuously determine the depth of the liquid collecting in the reject section 116 as it passes over the weir 117 into the outlet section 121. According to one embodiment, the sensor and control unit will effectively and continuously determine the distance 201 from the sensor 200 to the upper surface of the liquid flowing over the reject section weir 117 into the outlet section. The sensor may be an ultrasonic level transducer sensor that is attached to one of the walls of the reject section 116 above the reject section weir 117 (as seen in FIG. 2) or attached to the weir 117 itself (as seen in FIG. 6). An example of a suitable sensor may be an 18 mm diameter cylindrical analog output ultrasonic sensor from Pepperl+Fuchs, model number UB300-18GM40-I-V1. Such a sensor can provide a 4-20 mA output, which can be scaled into the control unit. If the sensor 200 is attached to the weir 117 itself, such as by bracket 210 in FIG. 6, there is an advantage that, if an operator should raise or lower the height of the reject section weir 117, the reference distance between the sensor 200 and the top of the reject section weir 117 is not effected by the change in the height of the weir 117.

The control unit 202 may be in communication, for example electrical contact, with the gas source 124 and/or the gas valve 130 to control the amount of gas being released from the gas supplying system 122 into the filtering chamber 100. The control unit 202 also in communication, for example electrical contact, with the sensor 200 so as to receive signals from the sensor and process the received signals to determine the amount of reject mixture in the reject section 116. The sensor may can be scaled into the control unit to continuously read the distance 201 between the sensor 200 and the surface of the reject mixture as it passes over the reject section weir 117. From this distance which is indicative of the amount of reject mixture in the reject section, the control unit 202 can then determine whether the portion of the granular media is being transported properly to the granular media washer by an airlift operation being provided by the gas supplying system.

According to one embodiment of the present invention, the control unit 202 is configured to determine whether the portion of the granular media is being transported properly to the granular media washer by receiving and comparing a sensor reading from the sensor 200 to a predetermined threshold. A "proper transport of granular media" can be the amount of transport caused by the airlift operation provided by the gas supplying system to the bed of granular media such that the release of excessive amounts of suspended solids into the filtrate (that is, breakthrough) is avoided. Examples of appropriate airlift operation of the granular media through the airlift housing can include operation of the gas supplying system such that a pressure differential between the top and bottom of the bed of granular media is within a predetermined range (such as 10, 15, 20, 30 psi or any integer therebetween), or such that a predetermined percentage of granular media (such as 5, 10, 20, 25, 30% or any integer therebetween) remains in motion.

The control unit may be configured to determine that there is a possible malfunction of the airlift operation in the granular media filter or the portion of the granular media is not being transported properly to the granular media washer when a level of the reject mixture passing over the weir 117 is above a predetermined threshold. The threshold may be some predetermined distance from the sensor. According to one embodiment, the threshold may be a vertical distance from the sensor to an acceptable level of reject mixture passing over the top of the weir 117 or the like. The control unit 202 also can be configured to operate the gas supplying system 122 to provide a gas burst to the granular media in the filtering chamber 100 for a predetermined time period if the portion of the granular media is not being transported properly by the gas supplying system 122 to the granular media washer. Alternatively or additionally, the control unit 202 can be configured to operate the gas supplying system 122 to provide gas bursts to the granular media in the filtering chamber for a predetermined plurality of time periods if the portion of the granular media is not being transported properly by the gas supplying system 122 to the granular media washer. The operation of the gas supplying system 122 may be controlled by the control unit through operation of the gas control valve 130 and/or the operation of the gas source 124 (for example, if the gas source 124 is a gas pump).

If the portion of the granular media is not being transported properly by the gas supplying system 122 to the granular media washer after the corrective measures taken by the control unit 202 (for example, after the gas supplying system has provided repeated gas bursts to the granular media in the filtering chamber for the predetermined plurality of time periods), the control unit may be configured to operate an alarm 204.

The control unit 202 may be constituted by a microcomputer comprising a central processing unit (CPU), a read-only memory (ROM), a random access memory (RAM), an input/output interface (I/O interface), a counter, and one or more timers. Alternatively or additionally, the controller may be constituted by a plurality of microcomputers. The control unit 202 comprises the necessary hardware and/or software to carry out its functions disclosed herein.

One embodiment of the present invention may execute at least the following steps. The control unit 202 detects a non-functioning airlift within a time period, for example seconds, of the occurrence by comparing readings from the sensor 200 to one or more thresholds. The control unit 202 then immediately initiates corrective actions to regain the proper airlift function, such as within 1, 2, 3, 4, or more seconds. After a specified wait time (for example, one, two, three, four, or more minutes), if the airlift had not regained proper functioning, the corrective actions will be repeated. These steps will be repeated a specified number of times (for example, two, three, four, five, or more times). If the airlift function is not reestablished after these repetitions, the alarm 204 will be triggered to summon physical attention from an operator. The alarm may be an audible alarm and/or a visual alarm.

Figure 3:
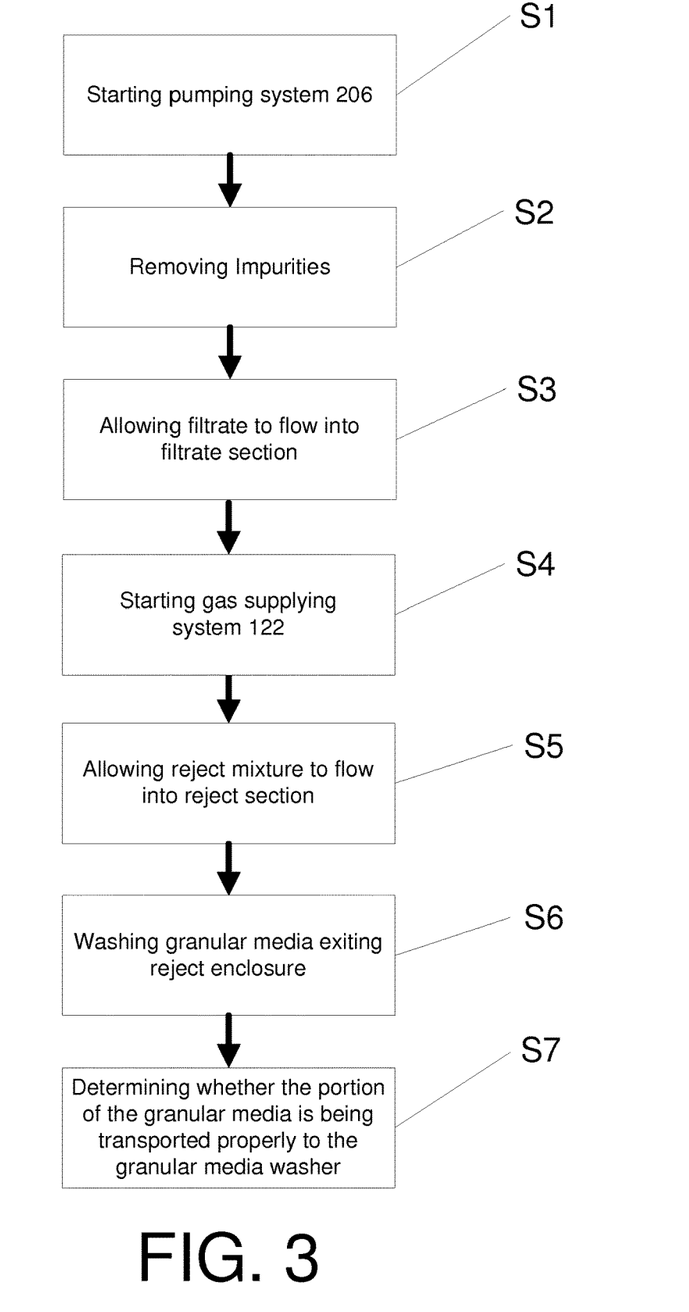
FIG. 3 shows a control method for treating a liquid containing impurities according to an embodiment of the present invention.

FIG. 3 shows a method for treating a liquid containing impurities that can be carried out by the control unit 202. In step S1, the pumping system 206 is started so that there is a pumping of the liquid containing impurities into a filtering chamber 100.

In step S2, impurities are removed from the liquid to produce filtrate by interaction between the liquid and granular media in a lower portion 102 of the filtering chamber 100. The impurities are removed from the liquid by the granular media to produce the filtrate. The granular media may be sand, the liquid may be water, and the gas may be air.

In step S3, the treated liquid (or filtrate) is fed or allowed to flow into the filtrate section 108 from the lower portion 102 of the filtering chamber 100 for subsequent outflow through the first outlet 110. There is no gas flow at the initial start up of the system, but the filtering takes place until a sensor above the weir 107 (not shown) detects a predetermined filtrate level at the weir 107 (in a similar manner as the sensor 200 above the reject section weir 117). The predetermined filtrate level may be any suitable level, such as, for example, greater than about zero (that is, filtrate starts pouring over the weir 107). Once the sensor above the weir 107 detects a predetermined filtrate level at the weir 107, the gas supplying system 122 is started in step S4 so as to deliver gas to the granular media 104 in the filtering chamber 100 to provide lift to the granular media 104 in the filtering chamber 100 to provide transport of a portion of the granular media via an airlift operation up the airlift housing, through the reject section, and to the granular media washer. Optionally, one or more gas bursts may take place upon initial start up of the gas supplying system, such as those that take place in steps S12-S14 of FIG. 4 (described below). With normal gas operation, the granular media 104 in the filtering chamber 100 can descend in a downward direction and the liquid in the filtering chamber 100 can flow in an upward direction such that the impurities are removed from the liquid by the granular media to produce the filtrate.

In step S5, the reject mixture containing granular media and impurities is fed or allowed to flow into the reject section 116 from the lower portion 102 of the filtering chamber 100 via the airlift housing 132 by subjecting a portion of granular media to an airlift function and collecting a mixture containing the portion of granular media subjected to the airlift function and a portion of the liquid with impurities in the reject section 116. The reject section 116 is in fluid communication with a second outlet 120 for outflow of a portion of the reject mixture that has gone over the reject section weir 117 into the outlet section 121 in which the portion of reject mixture in the outlet section substantially comprises liquid and impurities.

In step S6, the granular media from the reject section 116 is washed by the granular media washer 134 such that washed granular media are allowed to return to the filtering chamber 100.

In step S7, the control unit 202 monitors the granular media to determine whether the portion of the granular media is being transported properly to the granular media washer based on an amount of reject mixture in the reject section 116 and to institute corrections if necessary. After the process of executing steps S1-S7 has been first carried out, steps S2, S3, S5, S6, and S7 are then continually executed thereafter (with the gas supplying system performing normal operation).

Figure 4:
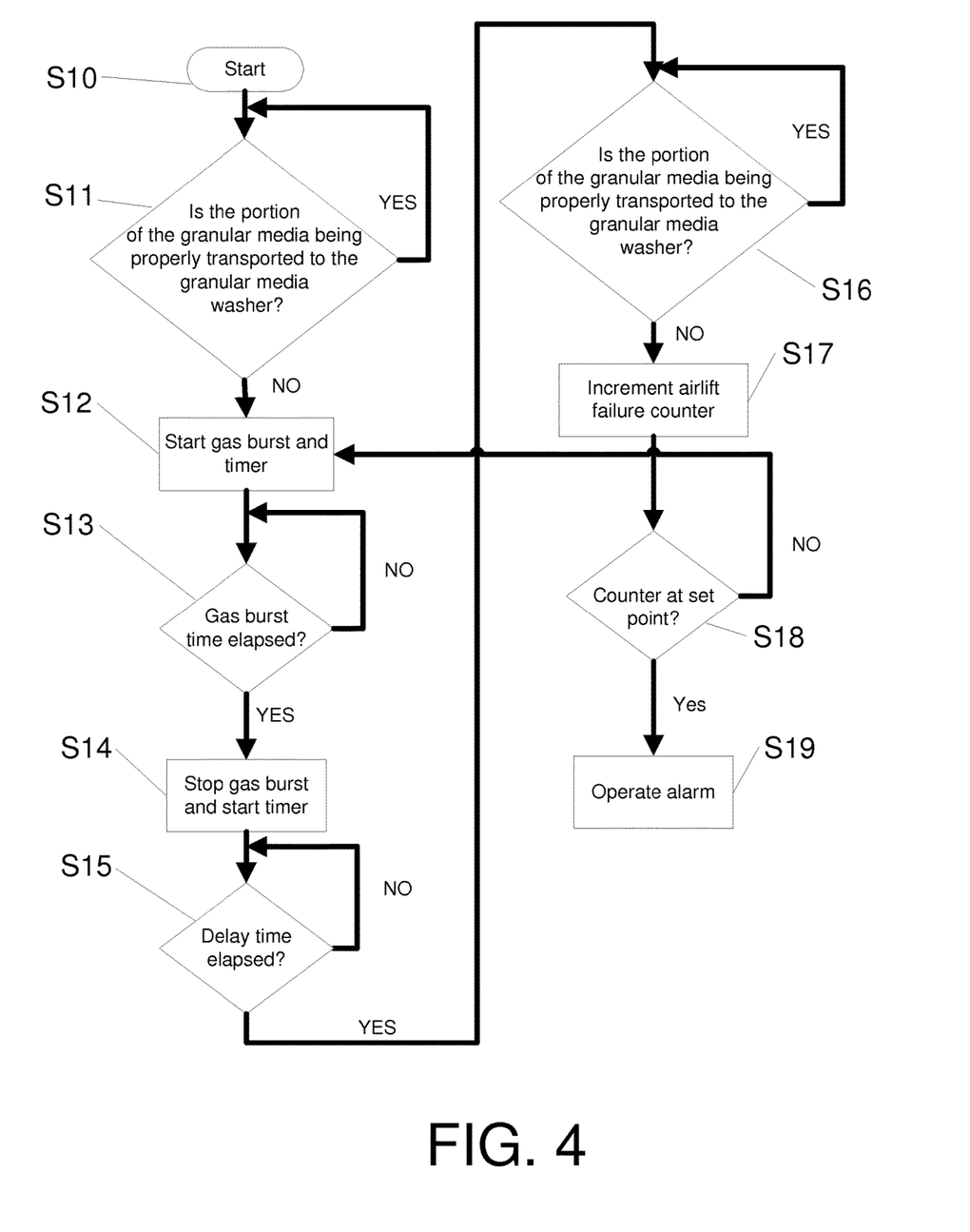
FIG. 4 shows a control method for monitoring the granular media to determine whether a portion of granular media is being transported properly to a granular media washer according to one embodiment of the present invention.

FIG. 4 shows one embodiment of monitoring and correcting to be carried out in step S7 by the control unit 202. In effect, FIG. 4 discloses a method for determining a possible malfunction of the airlift operation in a granular media filter by determining an amount of reject mixture in the reject section in which the airlift operation transports a portion of the granular media to a granular media washer. The monitoring of the granular media 104 to determine whether the portion of the granular media is being transported properly to the granular media washer 134 (via the airlift housing 132 and reject section 116) based on an amount of reject mixture in the reject section 116 is started in step S10.

In step S11, the control unit 202 receives readings from the sensor 200 to determine whether the portion of the granular media is being properly transported to the granular media washer 134 by the airlift operation caused by the gas delivery based on a level of reject mixture in the reject section 116, such as monitoring the level of reject mixture as it passes over the reject section weir 117. A proper transportation is determined by the control unit 202 to be provided by the gas delivery when the level of the reject mixture in the reject section 116 is below a predetermined threshold, e.g., the liquid level passing over the reject section weir 117 is not above a predetermined level. If there is a determination that the portion of the granular media is being properly transported to the granular media washer 134 by the airlift operation or gas delivery (that is, the answer is "Yes"), the process then repeats step S11 until the condition changes. There is a determination that the portion of the granular media is not being properly transported to the granular media washer 134 by the gas delivery (that is, the answer is "No" in step S11) when the level of the reject mixture in the reject section 116 is above a predetermined threshold, e.g., the liquid level passing over the reject section weir 117 is above the predetermined level. The process proceeds to step S12.

In step S12, once the control unit 202 determines that the granular media is not being properly transported to the granular media washer by the gas delivery by the gas supplying system, the control unit 202 may send command signals to the gas supplying system 122 such that the gas supplying system provides a gas burst to the granular media 104 in the filtering chamber 100 for a predetermined time period. In step S12, the gas supplying system 112 is commanded by the control unit 202 to commence providing the gas burst to the lower portion 102 of the filtering chamber 100. At the same time, a timer within the control unit 202 is started, and the process proceeds to step S13. The gas burst may be a short-timed gas burst of high pressure and/or high flow of a value that is higher than what is required for normal operation. According to one embodiment, the gas pressure of the gas burst may be in the range of about 10-100 psi, preferably in a range of about 20-40 psi, but any suitable gas pressure may be used based on the amount of granular media and other operating and design considerations.

In step S13, the control unit 202 continues to provide the gas burst and monitor the amount of time elapsed by the timer. When a predetermined time period has elapsed as judged by the amount of time detected by the control unit 202 from the timer, the process proceeds to step S14. The predetermined time period may be in the range of about 2-10 seconds, preferably in a range of about 3-5 seconds, but any suitable amount of time may be used based on the amount of granular media and other operating and design considerations.

In step S14, the control unit 202 commands to the gas supplying system 122 to stop providing gas burst and resume normal operation. At the same time, the same or a different timer from the one operated in steps S12 and S13 is started, and the process proceeds to step S15.

In step S15, the control unit 202 continues to provide normal gas supplying operation and to monitor the amount of time elapsed by the timer. When a predetermined time period has elapsed as judged by the amount of time detected by the control unit 202 from the timer, the process proceeds to step S16. The predetermined time period may be in the range of about 10 second to 10 minutes, preferably in the range of about 20 seconds to 2 minutes, but any suitable amount of time may be used based on the amount of granular media and other operating and design considerations.

In step S16, the control unit 202 receives readings from the sensor 200 to determine if the portion of the granular media going through the airlift housing is now being properly transported to the granular media washer by the gas delivery or airlift operation of the gas supplying system based on a level of reject mixture in the reject section 116. A determination that the granular media is being properly transported to the granular media washer is determined by the control unit 202 when the level of the reject mixture in the reject section 116 is below a predetermined threshold. If there is a determination that the granular media is being properly transported to the granular media washer by the gas delivery of the gas supplying system, the process then repeats step S16 until the condition changes. There is a determination that the granular media is not being properly transported to the granular media washer by the control unit 202 when the level of the reject mixture in the reject section 116 is above a predetermined threshold. In such an instance, the process proceeds to step S17.

In step S17, a counter provided in the control unit 202 is incremented. Upon start up of the apparatus 1, the counter is initialized to zero. For each correction based on the lack of proper transportation of the granular media to the granular media washer, the counter is incremented one. The process proceeds to step S18 in which a comparison is made by the control unit 202 to determine if the number of the counts by the counter has exceeded a predetermined value or set point, that is, has exceeded the number of permissible corrective measures of using gas bursts to improve lift. The predetermined value of counts may be in a range of about 2-10, preferably in the range of about 3-5, but any suitable number of counts may be used.

If the number of counts has not exceeded the predetermined value, the process proceeds to step S12. The control unit 202 may then send command signals to the gas supplying system 122 such that the gas supplying system provides another gas burst to the granular media 104 in the filtering chamber 100 for a predetermined time period. From step S12, the process then proceeds to step S13 to repeat and complete another corrective gas burst. Thus, the gas bursts to the granular media in the filtering chamber for a predetermined plurality of time periods are provided if the granular media is not being properly transported to the granular media washer by the gas delivery of the gas supplying system.

If the number of counts has exceeded the predetermined value, the process proceeds to step S19 such that the control unit 202 operates an alarm 204 when the proper transportation of the granular media to the granular media washer is not being provided by the gas delivery of the gas supplying system after the repeated gas bursts to the granular media in the filtering chamber for the predetermined plurality of time periods. Thus, operators may be summoned to address the improper transportation of the granular media. The control unit 202 may or may not shut down automatically after initiating the alarm.

Figure 5:
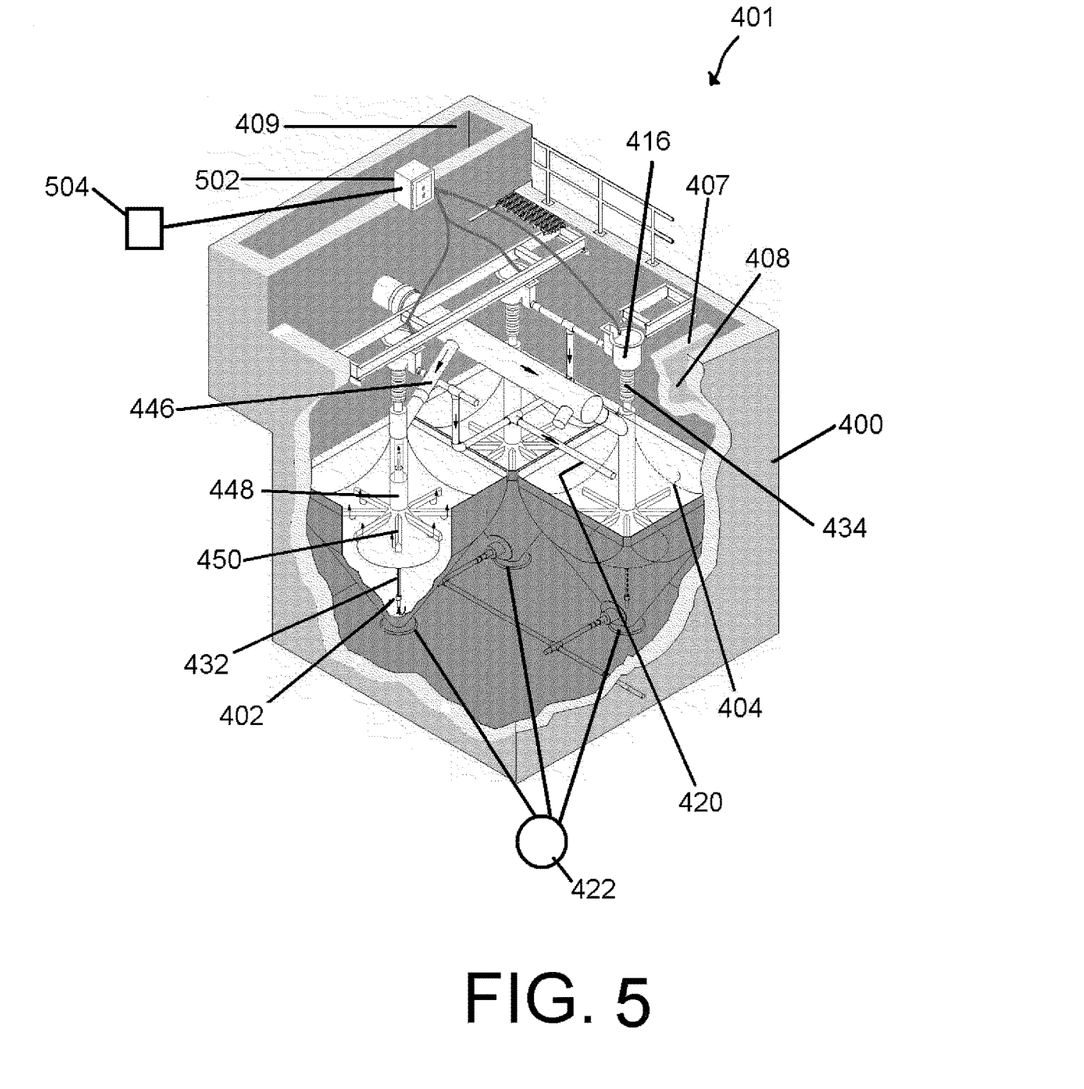
FIG. 5 shows a schematic drawings of an apparatus for treating a liquid containing impurities according to another embodiment of the present invention.

FIG. 5 shows an apparatus 401 for treating a liquid containing impurities according to another embodiment of the present invention. The apparatus 401 may comprise a filtering chamber 400 for accepting the liquid containing impurities, a filtrate section 408, a reject section 416, a gas supplying system 422, and a control unit 502.

The filtering chamber 400 includes a lower portion 402 in which granular media 404 removes the impurities from the liquid to produce filtrate. The filtering chamber 400 of FIG. 5 has a rectangular cross-sectional shape in its upper portion while the lower portion 402 comprises a plurality of conical shapes. Of course, the filtering chamber may be any suitable shape (such as, circular, triangular, or other polygonal or non-polygonal shape) or size and the conical shapes may be any suitable shape (such as, pyramidal) or size. Also, the number of conical shapes may be any suitable number, such as two, three, four, or more. The filtering chamber 400 may be in fluid communication with a first inlet 409 for inflow of influent or liquid containing impurities.

The first inlet 409 may be in fluid communication with a liquid source (such as a reservoir) which contains liquid containing impurities. The liquid may be wastewater or water with impurities. Impurities may be any undesired material, such as dirt or waste products. A pumping system can be used to channel the liquid from the liquid source to the first inlet 409 in which the pumping system contains all the necessary equipment to initiate and maintain for the fluid flow between the liquid source and the filtering chamber 400, such as a pump, a control valve, and/or piping or tubing. The first inlet 409 may comprise a feed pipe 446, an annular pipe 448, and radial pipes 450 for each conical shape. The influent or liquid containing impurities is introduced at the top of each feed pipe 446 and flows downward through each annular pipe 448 around an airlift housing 432. Each annular pipe 448 is sealed at its top end and is in fluid communication with its corresponding radial pipes 450 such that the liquid is introduced into the bottom of the bed of granular media in each conical shape through the series of radial pipes 450 that are open or have individual openings along their longitudinal length on the sides facing toward the bottom of the filtering chamber 400 (that is, downward in FIG. 5). Other configurations for the inlet are contemplated, as previously mentioned in relation to the embodiment of FIG. 1.

The granular media 404 in the filtering chamber 400 can descend in a downward direction and the liquid in the filtering chamber 400 can flow in an upward direction such that the impurities are removed from the liquid by impacting the granular media to produce filtrate at the top of the granular media 404.

The filtrate section 408 may be in fluid communication with the lower portion 402 of the filtering chamber 100 (that is, each conical shape) for receiving the filtrate that has passed through the granular media 404. According to one embodiment, the filtrate section 408 comprises a weir 407. The filtrate that has emerged at the top portion of the filtering chamber 400 pours over the weir 407 and into the filtrate section 408. The filtrate section 408 may be in fluid communication with a first outlet 410 for outflow of effluent or the filtrate. The first outlet 410 may be piping, tubing, or connections in which piping or tubing may be connected.

Reject sections 416 may be in fluid communication with the lower portions 402 of the filtering chamber 400 (that is, each conical shape) for receiving a reject mixture containing granular media and impurities. The reject sections may be a plurality of reject sections 416, one for each conical shaped lower portion 402. The fluid communication can be configured such that each reject section 416 is in fluid communication with a corresponding airlift housing 432 residing in each conical shape. The airlift housing 432 is a structure, such as a cylindrical pipe or tube, that may be disposed on the inside of its corresponding annular pipe 448. As the granular media 104 in the filtering chamber 400 descends in the downward direction such that the impurities are removed from the liquid by the granular media 404, near the bottom of each conical shape, a small volume of compressed gas (such as air, nitrogen, oxygen, or the like) is introduced at the bottom of each conical shape by the gas supplying system 422 so as to draw the granular media by airlift operation into each airlift housing 432 at the bottom end of each airlift housing 432. The scouring in the airlift housing dislodges any solid particles attached to the granular media. The reject mixture of granular media and dislodged impurities (which form a dirty slurry) is pushed to the top end of each airlift housing 432 and into its corresponding reject section 416.

Each reject section 416 may comprise an inlet section and an outlet section that are isolated from each other by a weir, similar to that shown in FIG. 1. The reject mixture that has emerged from each airlift housing 432 at the top end of each airlift housing 432 fills up the inlet section of each reject section 416 until a portion of the reject mixture pours over its corresponding weir into the outlet section of the reject section. The outlet section of each reject section 416 may also be in fluid communication with a second outlet 420 for outflow of the portion of the reject mixture that has poured over the weir. The second outlet 420 may be a piping, tubing, or a connection in which piping or tubing may be connected.

The inlet section of each reject section 116 is also in fluid communication with a corresponding granular media washer 434. Each granular media washer has a granular media inlet, a granular media outlet, and concentric stages, similar to that shown in the embodiment of FIGS. 1 and 2. From each reject section 416, the granular media falls into its corresponding granular media washer 434 via the granular media inlet and the lighter reject solids that were dislodged from the granular media flow are eventually poured over the weir and out the second outlet 420. The granular media cascades down through the concentric stages of each granular media washer 434. The concentric stages may simply comprise spiral flights around its corresponding airlift housing 432. As the granular media is cascading down the concentric stages, it encounters a small amount of filtrate moving upward through each washer 434 from the granular media outlet. This filtrate in the washers 434 is driven by the difference in liquid level between the filtrate pool in the filtering chamber 400 and the reject section 416. The heavier, coarser granular media flows through this small counter current flow while the remaining impurities are carried back up to the reject sections 416. The washed granular media returns to the filtering chamber and is deposited on the top of its corresponding granular media bed where it once again begins the influent cleaning process and its eventual migration to the bottom of the filtering chamber 400 (that is, the conical shapes).

The gas supplying system 422 may be provided for delivering gas to the granular media 404 in the filtering chamber 400 to transport a portion of the granular media 404, through the airlift housings and reject section to the granular media washers. The gas supplying system 422 may comprise a gas source, a gas line in fluid communication with the gas source, and a gas inlet attached to each conical shape of the filtering chamber 100. The gas source may be a fan, a gas pump, a pressurized cylinder of gas, or some other suitable source of gas. The gas source may also be within the housing of the filtering chamber or the gas source may be directly connected to the gas inlet. The gas being introduced into the filtering chamber 400 by the gas source may be air, nitrogen, oxygen, or some other suitable gas. A control valve may be optionally used to control the gas flow and/or pressure of the gas from the gas source to the lower portion 402 of each conical shape of the filtering chamber 400.

A sensor may be provided for determining a level of reject mixture in each reject section 416 and a control unit 502 may be provided to control the gas supplying system 422 and to receive one or more signals from the sensors. The combination of the sensor and control unit can be configured to effectively and continuously determine the distance between the sensor and the liquid (the reject mixture) passing over the weir of its corresponding reject section. According to one embodiment, the sensor and control unit will effectively and continuously determine the distance between the sensor and the surface level of the liquid flowing over one of the reject section weirs. The sensor may be an ultrasonic level transducer sensor that is attached to one of the walls of one of the reject sections 416 above its corresponding reject section weir 417 or attached to the corresponding the weir 417 itself. An example of a suitable sensor may be an 18 mm diameter cylindrical analog output ultrasonic sensor from Pepperl+ Fuchs, model number UB300-18GM40-I-V1. The control unit 502 may be in communication, for example electrical contact, with the gas source and/or the gas valve to control the amount of gas being released from the gas supplying system 422 into the filtering chamber 400. The control unit 502 also is in communication, for example electrical contact, with each sensor so as to receive signals from the sensors and process the received signals to determine the amount of reject mixture passing over the weir of its corresponding reject section 416. For example, the sensor may provide output, which can be scaled into the control unit to continuously read the current distance between the sensor and the liquid (reject mixture) passing over the reject section weir. From the determined amount of reject mixture in the section, the control unit 502 is then configured to determine whether the portion of the granular media being sent through the airlift housing and rejection section is being properly transported to the granular media washer by the gas supplying system for each conical shape.

According to one embodiment of the present invention, the control unit 502 is configured to determine whether the granular media is being properly transported to the granular media washer of each conical shape by comparing a sensor reading from the sensor to a predetermined threshold. In such an embodiment, the control unit may be configured to determine that proper transportation of the granular media to the granular media washer is not being provided in each conical shape by the gas supplying system 422 when a level of the reject mixture passing over the weir of its corresponding reject section 416 is above a predetermined threshold. The threshold may be some predetermined distance from the sensor. According to one embodiment, the threshold may be a vertical distance from the sensor to a predetermined level of liquid passing over the top of the weir or the like. The control unit 502 also can be configured to operate the gas supplying system 422 to provide a gas burst to the granular media in the conical shape of the filtering chamber 400 for a predetermined time period if proper transportation of the granular media to the granular media washer is not being provided by the gas supplying system 422 for the respective conical shape. Alternatively or additionally, the control unit 502 can be configured to operate the gas supplying system 422 to provide gas bursts to the granular media in the respective conical shape of the filtering chamber for a predetermined plurality of time periods if proper transportation of the granular media to the granular media washer is not being provided by the gas supplying system 422 in the respective conical shape. The operation of the gas supplying system 122 may be controlled by the control unit through the operation of the gas control valve and/or the operation of the gas source (for example, if the gas source is a gas pump). The control unit 502 may control the gas flow through each conical shape separately based on each sensor in their respective reject sections or all the conical shapes as one unit based on readings from one or all the sensors in the reject sections.

If proper transportation of the granular media to the granular media washer is not being provided by the gas supplying system 422 after the corrective measures taken by the control unit 502 (for example, after the gas supplying system has provided gas bursts to the granular media in the filtering chamber for the predetermined plurality of time periods), the control unit may be configured to operate an alarm 504.

The control unit 502 may be constituted by a microcomputer comprising a central processing unit (CPU), a read-only memory (ROM), a random access memory (RAM), an input/output interface (I/O interface), a counter, and one or more timers. Alternatively or additionally, the controller may be constituted by a plurality of microcomputers. The control unit 502 comprises the necessary hardware and/or software to carry out its functions disclosed herein.

The above-disclosed system and method provides immediate automatic detection and correction to failed airlifts in the filtering bed in a granular media filter so as to maintain continuous and reliable airlift operation. Also, such immediate and automatic detection and correction may significantly reduce the required vigilance and labor which is currently required by on-site personnel.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An apparatus for treating a liquid containing impurities, comprising:
    a filtering chamber for receiving liquid containing impurities, the filtering chamber including a lower portion containing granular media and configured to permit the granular media to interact with the liquid containing impurities, thereby removing impurities from the liquid to produce filtrate;
    a filtrate section in fluid communication with the filtering chamber for receiving the filtrate, the filtrate section being in fluid communication with a first outlet for outflow of the filtrate;
    a gas supplying system for delivering gas to the granular media in the filtering chamber for transport of a portion of the granular media to a granular media washer;
    a reject section in fluid communication with the granular media washer for receiving a reject mixture comprising liquid and impurities from the granular media washer, the reject section being in fluid communication with a second outlet for outflow of a portion of the reject mixture; and
    a control unit that is configured to determine a condition of transport of the portion of the granular media by determining whether a level of reject mixture in the reject section exceeds a predetermined threshold,
    wherein, upon determining that the level of reject mixture in the reject section exceeds the predetermined threshold, the control unit is configured to send a command signal to the gas supplying system to control delivery of gas to the portion of the granular media.

2. The apparatus of claim 1 in which the filtering chamber is configured such that the granular media in the filtering chamber can descend in a downward direction and liquid in the filtering chamber can flow in an upward direction such that the impurities are removed as the liquid moves upward through the granular media to produce the filtrate.

3. The apparatus of claim 1 in which the granular media washer is in fluid communication with the filtrate section.

4. The apparatus of claim 3 in which the granular media washer is configured such that the transported granular media cascade down through concentric stages while a small amount of filtrate moves upward through the concentric stages such that washed granular media return to the filtering chamber.

5. The apparatus of claim 1 in which the control unit receives a sensor reading from a sensor for determining the level of reject mixture in the reject section.

6. The apparatus of claim 5 in which the level of reject mixture in the reject section is determined based on a level of reject mixture flowing from an inlet section to an outlet section of the reject section.

7. The apparatus of claim 6 in which the sensor comprises an ultrasonic level transducer.

8. The apparatus of claim 5 in which the control unit is configured to compare a sensor reading from the sensor to the predetermined threshold.

9. The apparatus of claim 5 in which the sensor is attached to a wall of the reject section.

10. The apparatus of claim 6 in which the inlet section is divided from the outlet section by a weir.

11. The apparatus of claim 10 in which the control unit is configured to determine if the level of the reject mixture flowing over the weir is above the predetermined threshold.

12. The apparatus of claim 11 in which the control unit is configured to operate the gas supplying system to provide a gas burst if the control unit determines that the level of the reject mixture flowing over the weir is above the predetermined threshold.

13. The apparatus of claim 12 in which the control unit is configured to operate the gas supplying system to provide gas bursts for a predetermined plurality of time periods.

14. The apparatus of claim 13 in which the control unit is configured to operate an alarm when the control unit fails to determine that the level of the reject mixture does not exceed the predetermined threshold after the gas supplying system is operated to provide the gas bursts for the predetermined plurality of time periods.

15. The apparatus of claim 1 in which the granular media comprises sand and the liquid comprises water.

16. A method for treating a liquid containing impurities, comprising:
    feeding a liquid containing impurities into a filtering chamber containing granular media;
    removing impurities from the liquid to produce filtrate by allowing granular media, liquid and impurities to interact in a lower portion of the filtering chamber;
    allowing filtrate to flow to a filtrate section for subsequent outflow through a first outlet;
    delivering gas to granular media in the filtering chamber to transport a portion of the granular media to a granular media washer;
    allowing a reject mixture comprising liquid and impurities to flow to a reject section from the granular media washer, the reject section being in fluid communication with a second outlet for outflow of a portion of the reject mixture;
    determining, by a control unit, a condition of transport of the portion of the granular media by determining whether a level of reject mixture in the reject section exceeds a predetermined threshold, and
    upon determining that the level of reject mixture in the reject section exceeds the predetermined threshold, sending, by the control unit, a command signal to control delivery of gas to the portion of the granular media.

17. The method of claim 16 in which granular media in the filtering chamber can descend in a downward direction and liquid in the filtering chamber can flow in an upward direction such that impurities are removed from the liquid by the granular media to produce filtrate.

18. The method of claim 16 in which granular media washed in the granular media washer are allowed to return to the filtering chamber.

19. The method of claim 16 in which the level of reject mixture in the reject section is based on a level of reject mixture in an inlet section of the reject section.

20. The method of claim 16 further comprising determining whether a level of the reject mixture flowing from an inlet section to an outlet section of the reject section is above the predetermined threshold.

21. The method of claim 20 in which controlling the delivery of gas comprises providing a gas burst to granular media in the filtering chamber if the level of reject mixture flowing from the inlet section to the outlet section of the reject section is above the predetermined threshold.

22. The method of claim 21 further comprising providing gas bursts to granular media in the filtering chamber for a predetermined plurality of time periods.

23. The method of claim 22 further comprising operating an alarm if it is determined that a pressure differential between a top and a bottom of a bed containing the granular media is not within a predetermined range after the gas bursts to the granular media in the filtering chamber are provided for the predetermined plurality of time periods.

24. The method of claim 16 in which the granular media comprises sand and the liquid comprises water.

25. The apparatus of claim 1 in which the control unit is configured to determine an amount of reject mixture in response to a sensor reading from a sensor in the reject section.

26. The method of claim 16 in which the control unit performs the step of determining the condition of transport, and further performs a step of determining an amount of reject mixture in response to a sensor reading from a sensor in the reject section.

27. The apparatus of claim 25 in which the sensor is disposed above a weir, or, alternatively, on a lateral side of the weir.

28. The method of claim 26 in which the sensor is disposed in above a weir, or, alternatively, on a lateral side of the weir.

29. The apparatus of claim 25 in which the sensor is attached to a weir in the reject section.

30. The method of claim 26 in which the sensor is attached to a weir in the reject section.

* * * * *